Patented Nov. 26, 1929

1,737,330

UNITED STATES PATENT OFFICE

DONALD K. PATTILLO, OF FULTON, AND JAMES H. MacMAHON, OF NIAGARA FALLS, NEW YORK, ASSIGNORS, BY DIRECT AND MESNE ASSIGNMENTS, TO THE MATHIESON ALKALI WORKS, INC., OF NEW YORK, N. Y., A CORPORATION OF VIRGINIA

PRODUCTION OF PAPER

No Drawing. Application filed December 23, 1927. Serial No. 242,283.

This invention relates to improvements in the operation of paper mills and the production of paper therein.

The slime problem is one of the serious problems met with in paper mill operations. So also, in paper mill operations, considerable loss occurs in the so-called white water discharged from the mill.

The present invention provides an improved process in which the slime problem is overcome and the losses in the white water greatly reduced. The present invention also presents important advantages in the operation of the paper mill, and enables an increased production of paper to be obtained.

According to the present invention, the stock going to the paper machine is a stock which has been sterilized by treatment with chlorine and is stock which has been subjected to a coagulating treatment, so that the paper is formed on the paper making machine from a sterilized stock containing coagulated material, thereby giving an increased production of sterilized paper and a white water free or approximately so from coagulatable material.

Our investigations of the occurrence of slime and pitches at various points in paper mills indicate that they are of bacterial formation and must be distinguished as being of distinct characters or classes. The slimes include those directly caused by bacterial or algaeous growth in the raw water supply, as well as slimes directly caused by the various types of bacterial growths, for the most part putrefactive and pathogenic, in the raw materials. Both of these classes of slimes may be present. Pitches or "beater gum" which form for the most part in the beating engines and subsequent stock chests differ radically from slimes in that they are denser and usually of a much darker color and for the most part contain sulfides. Essentially they have the characteristics of a dehydrated slime.

Slime deposit caused by the micro-organisms in the raw water supply can be effectively destroyed by sterilization of the raw water; but slimes due to putrefactive and pathogenic bacteria in the raw materials used cannot be readily destroyed by sterilization of the raw water without excessive consumption of chlorine, where chlorine is employed for the sterilization.

We have found, however, that slime formations due to such putrefactive and pathogenic bacteria in the raw material employed, particularly in raw materials such as rag stock, waste newspaper stock, etc., can be effectively destroyed by subjecting the stock at an appropriate point in the mill to a regulated treatment with chlorine. We have found also that the sterilization of the water and stock can advantageously be carried out as a multi-stage operation with treatment of the raw water with chlorine to destroy its slime forming organisms, and by treatment in the mill of the stock containing the raw material, while it is at a proper state of dilution, and before it goes to the paper machine.

In treating the stock in the paper mill, the stock is advantageously treated with chlorine in a highly diluted state, or in such a state of dilution that the chlorine treatment will result in destruction of the objectionable slime forming organisms without attacking the fibres of the stock. While in general the chlorine treatment of the stock in the mill may be at different parts of the mill, where the stock is of proper dilution, the addition of chlorine can be made with particular advantage at that part of the mill where the pulp is highly diluted in the mixing box before it is fed to the paper machine. In such case, where raw water is subsequently added to the stock to further dilute it, as in the showers, the raw water is also advantageously treated with chlorine before it is so used, so that the stock going to the paper machine will be a sterilized stock.

Some kinds of raw material develop a fungus or mold when they are stored, particularly in the case of stored ground wood pulp. A considerable decomposition of cellulose of the stored ground wood pulp may be caused by such fungus or mold. A similar phenomenon also occurs to a less marked degree with sulfite pulp. Such pulp is advantageously subjected to chlorine sterlization during its process of manufacture, with maintenance of sufficient residual chlorine in the manufactured pulp to effectively prevent the formation of mold for a reasonable time of storage. In the majority of cases, however raw materials will be mechanically reduced to a fibrous state and treated with suitable amounts of chlorine introduced at an effective sterilization point, sufficient to destroy any existing bacterial growth and at the same time leave a residual chlorine content of around one-half part to one part per million in the water carrying medium. Our investigations have shown that such a sterilization effectively eliminates slime of the character referred to.

Pitch or "beater gum" is commonly found on the sides and bottom of beating engines and to a less extent in subsequent chests. Our investigations indicate that this material is formed by bacterial decompositon of cellulose materials under favorable conditions. Our investigations indicate that pitch is made up of decomposed bacterial bodies in combination with calcium salts and decomposed cellulose and that, except for its calcium content, it has the characteristics which would be associated with partially dehydrated slime. Where pitch occurs, slime is always present, and the combination of both pitch and slime is particularly objectionable in its effect upon paper making operations. Serious pitch troubles are often encountered where the beating operation is of great duration, and where materials such as soluble starch are added during the beating. The presence of such material as starch appears to favor the bacterial growth which results in pitch formation. Where pitch formation takes place, it is frequently progressive in character and develops to an extent where some of the pitch may break away from the sides of the apparatus and be carried with the pulp to the paper machine, giving objectionable dark places in the paper.

In order to prevent or control such pitch formation, we subject the pulp before it is added to the beater, or we treat the pulp in the beater, with chlorine in sufficient amounts to sterilize the pulp and leave a small amount of residual chlorine. Once the accumulation of slime which may exist in a mill is removed and sterile conditions obtained throughout the mill, the further prevention of pitch requires only that conditions unfavorable to pitch formation be maintained, for example, by maintaining sterile conditions in the beater or by so controlling slime and pitch formation that objectionable pitch formation does not take place, and by subsequently sterilizing the stock before it goes to the paper machine.

In its broader aspects, the present invention includes various methods of treating the stock, or both the stock and the raw water, with chlorine, prior to the paper making operation, so that the stock going to the paper machine is a sterilized stock; in combination with the treatment of the sterilized stock with coagulating agents to cause coagulation of short fibres and of soluble and insoluble coagulable material contained in the stock prior to the paper making operation so that the coagulation will take place in the absence of slime and so that the coagulated material will be included in the web formed in the paper making machine. Within this broad sterilizing treatment we consider that treatment particularly advantageous which involves adding chlorine to the diluted stock while it is at a high state of dilution, such as the stock in the condition in which it flows through the mixing box. With dilute stock of this kind a minimum of chlorine is required and the water content of the stock can be effectively sterilized without the chlorine attacking the fibres. Such chlorine treatment effectively destroys or prevents slime.

In combination with such preliminary treatment of the stock with chlorine to sterilize it before it goes to the paper making machine, we also subject the stock to a coagulating treatment before it goes to the paper making machine.

The stock which is subjected to coagulation is a sterilized stock which contains a small amount of residual chlorine, around one-half part to one part per million. When coagulating materials are added to such diluted stock freed from slime they effectively coagulate a considerable amount of short fibres and colloidal and finely divided material which would otherwise go into the white water. By coagulating such materials ahead of the paper making operation, the coagulated material is held in the paper produced and gives a materially increased production of paper from the stock treated. This coagulated material includes not only short fibres which would not otherwise be held by the screen of the paper machine, but also finely divided material and colloidal material which would otherwise pass into the white water, but which, by coagulation, are changed into such a condition that they are held by the screens of the paper machine and become intimately admixed and blended with the other fibres of the stock to produce an improved paper product.

The preliminary chlorine treatment and coagulation of the stock gives a particularly free stock from which the water readily separates. The wires of the paper making machine are also kept much cleaner and can be operated for longer periods of time before cleaning is necessary. Difficulties due to the presence of slime in the stock passing over the paper machine are eliminated.

The chlorine treatment of the stock can be carried out with gaseous chlorine introduced directly into the stock or with the introduction of chlorine water or a solution of hypochlorous acid or a hypochlorite. A particularly advantageous method of introducing the chlorine is by combining the chlorine continuously with water in regulated amount and introducing the chlorinated water into the stock.

The amount of chlorine required for the treatment of the stock will vary with different stocks, but it should be sufficient to leave a small residual chlorine content in the treated stock. We have found that a residual chlorine content of around one-half part to one part per million is sufficient and effective. Such residual chlorine content is determined by the standard ortho-tolidine test of the American Public Health Association. The amount of chlorine required for any particular stock can readily be determined by testing and by then adding sufficient chlorine to give a residual chlorine content in the pulp to the extent indicated. It will be evident that in mills which have been operated without chlorine treatment, a considerable excess of chlorine may be required to take care of the accumulated slime and to bring the mill to a sterilized condition such that thereafter only the normal amount of chlorine will be required to maintain the mill in proper condition of operation.

In general, we consider it advantageous to subject the raw water entering the mill to chlorination in order to insure the removal of all bacterial growths, but in some cases such preliminary chlorination of the water may be omitted, where the chlorine treatment in the mill itself sufficiently takes care of the slime and slime-forming organisms present in the stock. When the raw water is chlorinated, only sufficient chlorine is added to take care of the organisms in the raw water and to leave therein a residual chlorine content of around one-half part to one part per million.

The chlorine treatment of the present invention is particularly advantageous when carried out as a two-stage chlorination, with chlorination of the raw water supply in the manner indicated, and with further chlorination of the raw materials in the mill at a point of effective sterilization. In such two-stage chlorination process, we chlorinate the raw water to leave therein a residual chlorine content ranging from about one-half part to one part per million and we also subject the stock in the mill to effective chlorination. This chlorination in the mill should be at such a point that the chlorine will effectively sterilize the stock without attacking the fibres to an objectionable extent or consuming excessive chlorine.

We have found that the chlorination of the stock can be advantageously effected by adding chlorinated water to the stock at the entrance of the mixing box, ahead of the paper machine. At this point, there is the maximum dilution of stock with water and sufficient agitation to insure a thorough mixing of chlorine with the fibre-water mixture. We have found that the time period between this point and the point of couching the paper web was sufficient to remove the slime. The chlorine can, however, be added at some other point where the stock is sufficiently diluted. The addition of chlorine is regulated to give a residual chlorine content in the stock of about one-half to one part per million.

Such treatment with chlorine and elimination of slime makes possible effective coagulation of soluble and insoluble constituents and short fibres carried in the stock so that the coagulated materials can be incorporated in the paper along with the other fibres. Such coagulating treatment, prior to the paper making operation, eliminates the necessity of treating the white water to coagulate and recover short fibres and other materials from it, and eliminates the separation of the resulting coagulated raw material from the white water and its separate handling to incorporate it in the paper produced in a subsequent operation. The present invention incorporates the coagulated material in the paper web immediately after coagulation and without the need of separate recovery steps for recovering the coagulated material. The coagulated material produced in the present process moreover is free from slime and is therefore an improved and particularly advantageous form of coagulated material for incorporating in the paper.

Different coagulating materials can be employed for the coagulating treatment. Among the coagulating materials which may be mentioned are alum, alum with sodium aluminate, alum with caustic soda, ferric chloride, etc. The amount required can be somewhat varied, but will be in general around one or two pounds of coagulating material per thousand gallons of stock treated. The coagulating material can be added in solution or in solid form with sufficient agitation to insure thorough and uniform distribution thereof throughout the stock to be treated. We have found it important to have a small amount of residual chlorine present in the stock at the time the coagulating material is added, such as a residual chlorine content of around one-half part to one part per million.

We have found that where chlorine is added to the diluted pulp as it enters the mixing box, the action of the chlorine is almost instantaneous, and that the coagulating material can be added to the stock as it flows through the mixing box almost immediately after the introduction of the chlorine, so that coagulation will take place during the flow of the stock on its way to the paper machine. Coagulation takes place rapidly and by effecting it in a continuous manner as the stock flows through the mixing box, the coagulation will take place so that the coagulated material will be incorporated into the paper web as it is being formed on the paper machine. We do not, however, limit ourselves to adding the coagulant at this point, although it can be so added in combination with the preliminary chlorine treatment in a particularly advantageous way. The preliminary sterilization of the stock before coagulation insures that the coagulated material will itself be sterile and free from objectionable slime and organisms causing further decomposition. The paper produced therefore, will not only contain the coagulated material but it will be of a sterilized character protected from further decomposition through bacterial action such as would be caused by the inclusion of coagulated slime-containing and bacteria-containing materials.

The coagulation and recovery of coagulated materials in this way recovers and includes in the paper produced much material which would otherwise go into the white water and be lost with the white water, or which would require separate treatment of the white water for its recovery. The coagulating treatment of the present invention therefore decreases the shrinkage between the raw stock and the paper produced, as well as giving a slime free sterilized paper product which contains the coagulated materials incorporated in it in a sterilized condition.

In order to obtain effective coagulation we have found it important to maintain a regulated pH value in the stock subjected to the coagulating treatment. The pH value will vary somewhat with different stocks, but we have found a pH value of around five or six particularly effective with certain stocks.

One of the important advantages of the present invention is the marked increase in hydration of the fibres in the stock after it has been subjected to the treatment with chlorine and to coagulation, as compared with the hydration of the fibres before such treatment. The measurement of fibre hydration is one of the accepted standards of measurement of the paper making qualities of cellulose fibres, and, in the beating operation, where increased hydration is desired, it is common to continue the beating operation until a sufficient degree of hydration has been thereby effected. The present invention makes possible a decrease in the beating required to effect hydration, and supplements the hydration due to beating with hydration resulting from the treatment with chlorine and the coagulation treatment. While we do not desire to limit ourselves by any theoretical explanation of the hydration which is brought about as a result of such treatment, it seems probable that the removal of slime by the chlorine treatment and the coagulation of colloidal matter present in the stock brings about a change in the physical condition of the fibres, or effects the osmotic pressure between the inside of the fibres and the surrounding water, or otherwise causes water to penetrate the fibres and give the effect indicated by increased hydration when tested for fibre hydration. The hydration of cellulose fibre is one of the governing factors in the operation of a paper machine and one of the controlling factors in the qualities of the finished product. In general, the more water the fibre contains internally, the "slower" the stock and the greater the hydration. Further, the greater the hydration, the more compact the paper and the greater the differences in qualities from paper made from a less hydrated fibre.

Because of the marked increase in hydration resulting from the treatment of the stock with chlorine and by coagulation, a stock which has been hydrated in the beater can be still further hydrated by such treatment, or, allowing for the hydration resulting from such treatment, the hydration due to beating can be correspondingly reduced, with resulting economy in the beating operation. In some stocks, such as felts for roofing and flooring, and blotter stocks, the absorption goes down with increase in hydration; and, in such stocks, the beating should be reduced to avoid objectionable decrease in absorption. With other stocks, such as kraft stocks, increased hydration brings about increased strength, which is desirable in many cases. The increased hydration resulting from the process of the present invention does not however, slow down the stock to an objectionable extent, but leaves a "free" stock from which the water readily separates on the paper machine. The possible cutting down of the time of beating not only decreases power and labor costs, but makes possible an increase in production.

The increased rate at which water separation takes place from the fibres, after the treatment with chlorine and the coagulation treatment, seems to indicate that the colloidal phase of the solution is broken down and the coagulated colloids converted into such a shape that they separate rapidly from the carrying medium without slowing down and impeding the water separation.

The present process thus combines the advantages of giving a highly hydrated pulp which is nevertheless free flowing and from which water rapidly separates. We have obtained, for example, an increase in hydration of around twenty-five percent by the treatment with chlorine and the subsequent coagulation, and we have obtained an increase in speed of fibrewater separation of around one thousand to twenty-five hundred percent. This makes possible an increased speed of operation of the paper making machine and an increase in production of paper. It also makes possible the use of finer wire screens on the paper machine which tends further to increase the mechanical recovery of paper from the stock employed.

The white water produced in the present process will be free or practically so from coagulable material and, if run to waste, will carry with it a relatively small amount of valuable material. This water can, however, be employed in the mill in place of fresh water to a greater or less extent, thereby making unnecessary the chlorination treatment of a corresponding amount of fresh water. In such a closed system of operation, with introduction of only enough water to balance unavoidable losses, the shrinkage losses are reduced to a minimum. Closed systems containing slime present difficulties due to the accumulation of slime. The treatment of the present invention not only eliminates slime from the circulating returned water, but also frees the water to a large extent from colloidal material so that the white water presents advantages which make it valuable for use in a closed system.

The advantages which the present invention presents are thus cumulative and supplementary in character. The elimination of slime by the treatment with chlorine keeps the felts cleaner and gives them a longer life; the elimination of slime and pitch insures that a high grade product is produced free from objectionable pitch spots in the finished product; the decrease or removal of slime and the coagulation of colloidal material enables the operation of the mill to be prolonged and causes less loss of time for cleaning and shutdown, while increasing the wearing life of the paper machine woolen felts and greatly reduces the clogging of the felts and of the paper screens; the cleaner condition of the paper machine wires, due to the absence of slime and pitch and the coagulation of colloidal material, permits better formation of the paper web, increases the wire life, and decreases the amount of time lost in necessary shutdown and cleaning of the wires; there are decreased labor and material charges for the cleaning operation; deterioration of cellulose caused by the action of destroying bacteria on the wood structure is eliminated or minimized; an increased production of paper is made possible from the stocks treated; the hydration of the fibres can be materially increased thus making possible a reducing in the amount of beating required; materials which ordinarily are wasted with the white water or require a separate treatment for their recovery are included in the paper produced from the stock treated; an increase in speed of fibre-water separation of the paper machine is obtained; the operation of a closed system with water free from slime and pitch is made possible and other advantages are obtained in the paper mill operation.

We claim:—

1. The improvement in the operation of paper mills, which comprises subjecting the stock from which the paper is to be produced to treatment with chlorine to effect sterilization of the stock and to remove slime therefrom, and without washing, forming paper from the sterilized stock.

2. The improvement in the operation of paper mills, which comprises subjecting the stock from which the paper is to be produced to treatment with chlorine to effect sterilization of the stock, subjecting the sterilized stock to a coagulating treatment, and forming paper from the resulting coagulated stock.

3. The improvement in the operation of paper mills, which comprises subjecting the stock from which the paper is to be produced to the action of chlorine by introducing chlorine therein at a point of high dilution of the stock before the stock goes to the paper machine, and forming paper from the resulting treated stock.

4. The improvement in the operation of paper mills, which comprises subjecting the stock from which the paper is to be produced to the action of chlorine by introducing chlorine therein at a point of high dilution of the stock before the stock goes to the paper machine, subjecting the resulting stock to a coagulating treatment and forming paper from the resulting stock thereby obtaining a sterilized paper containing the coagulated material.

5. The improvement in the operation of paper mills, which comprises subjecting the stock from which the paper is to be made to treatment with chlorine by adding chlorine thereto continously as the diluted pulp passes through the mixing box ahead of the paper machine.

6. The improvement in the operation of paper mills, which comprises subjecting the stock from which the paper is to be made to treatment with chlorine by adding chlorine thereto continously as the diluted pulp passes through the mixing box ahead of the paper machine, subjecting the pulp thereafter to a coagulating treatment, and forming paper from the stock after such treatment.

7. The improvement in the operation of paper mills, which comprises subjecting the stock to beating and discontinuing the beating before the desired degree of hydration has been obtained, subjecting the beaten stock to treatment with chlorine to effect sterilization and to coagulation after such sterilization and thereby increasing the hydration of the fibres of the stock, and forming paper from the resulting stock.

8. The improvement in the operation of paper mills, which comprises subjecting the stock from which the paper is to be made, while it is at substantially its minimum fibre density and contains only around one percent or less of cellulose fibres (on a bone-dry basis) to the action of chlorine to effect sterilization of the stock without injuring the fibres.

9. The improvement in the operation of paper mills which comprises subjecting the stock from which the paper is to be made to treatment with chlorine in amount such that there remains in the treated stock a residual chlorine content of about one-half to one part per million, and, without washing, forming paper from the treated stock.

In testimony whereof we affix our signatures.

DONALD K. PATTILLO.
JAMES H. MacMAHON.